United States Patent [19]

Tessenske

[11] 4,011,768
[45] Mar. 15, 1977

[54] PUMP SWASH PLATE CONTROL LINKAGE
[75] Inventor: Dean James Tessenske, Horicon, Wis.
[73] Assignee: Deere & Company, Moline, Ill.
[22] Filed: Apr. 16, 1975
[21] Appl. No.: 568,703
[52] U.S. Cl. .................................. 74/479; 74/470; 74/481; 180/77 R; 180/82 A
[51] Int. Cl.² ........................................ G05G 11/00
[58] Field of Search ................. 74/470, 481, 480 R, 74/479; 180/77 R, 66 R

[56] References Cited
UNITED STATES PATENTS

| | | | |
|---|---|---|---|
| 3,431,792 | 3/1969 | Smith | 74/481 |
| 3,525,266 | 8/1970 | Brooks et al. | 74/481 |
| 3,727,480 | 4/1973 | Need | 74/470 |
| 3,868,003 | 2/1975 | Smith | 74/481 X |
| 3,898,891 | 8/1975 | Colloton | 180/77 R X |

Primary Examiner—Samuel Scott
Assistant Examiner—F. D. Shoemaker

[57] ABSTRACT

A manually controllable linkage is provided for selectively adjusting the swash plate of a reversible flow, variable displacement pump of a hydrostatic transmission. The linkage includes a speed and direction selecting part for selectively moving the swash plate so as to effect forward, reverse and neutral driving conditions in the transmission, and a neutral return part for overriding the speed and direction selecting part for quickly returning the swash plate to its position for effecting the neutral driving condition in the transmission. The speed and direction selecting part of the linkage includes input and output sections interconnected by a motion-moderating section which regulates or governs the maximum speed at which the output section and, hence, the swash plate may be moved regardless of the speed manually imparted to the input section.

5 Claims, 6 Drawing Figures

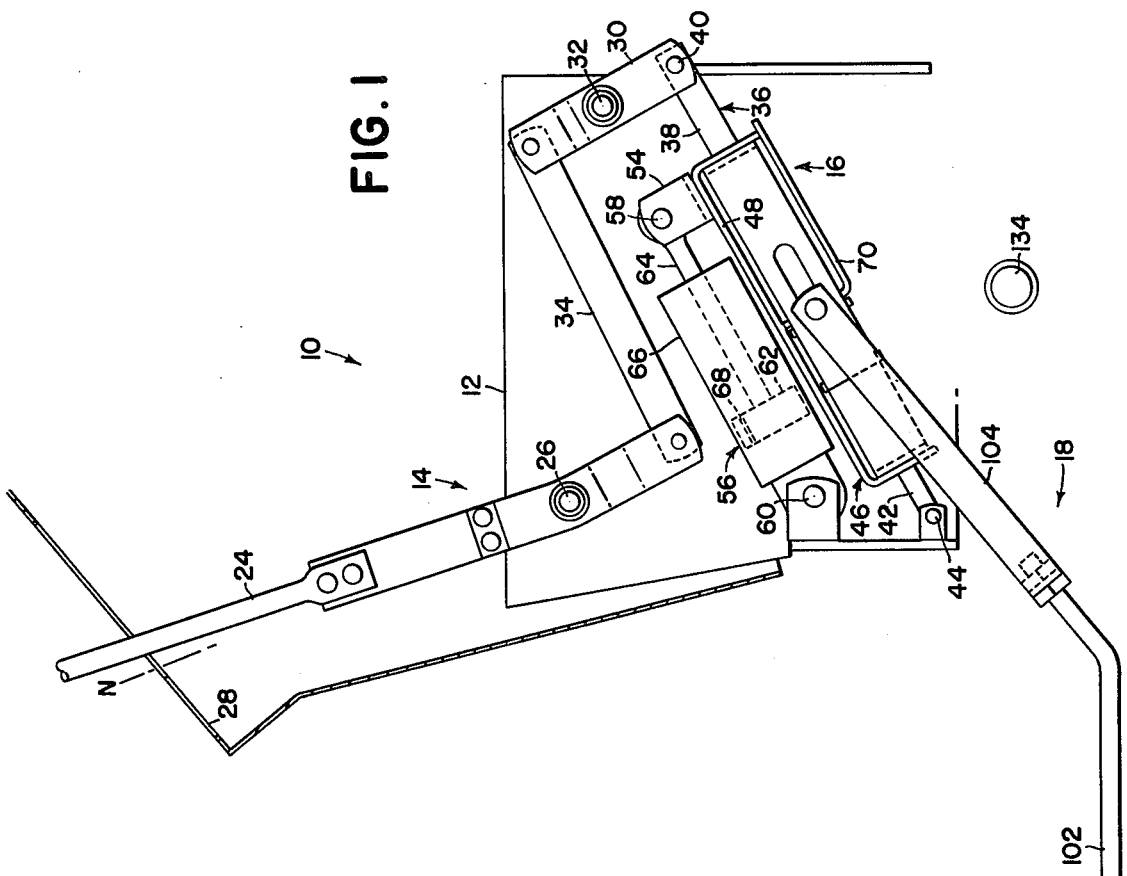
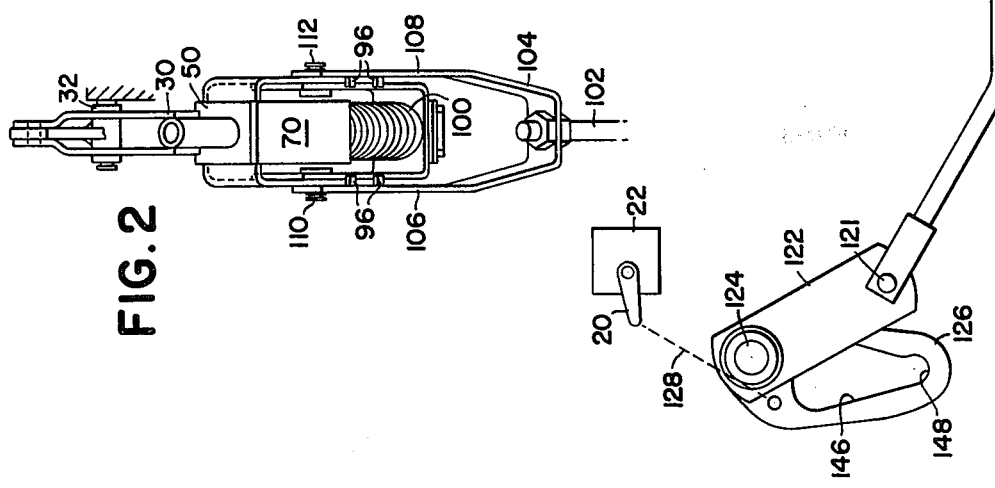

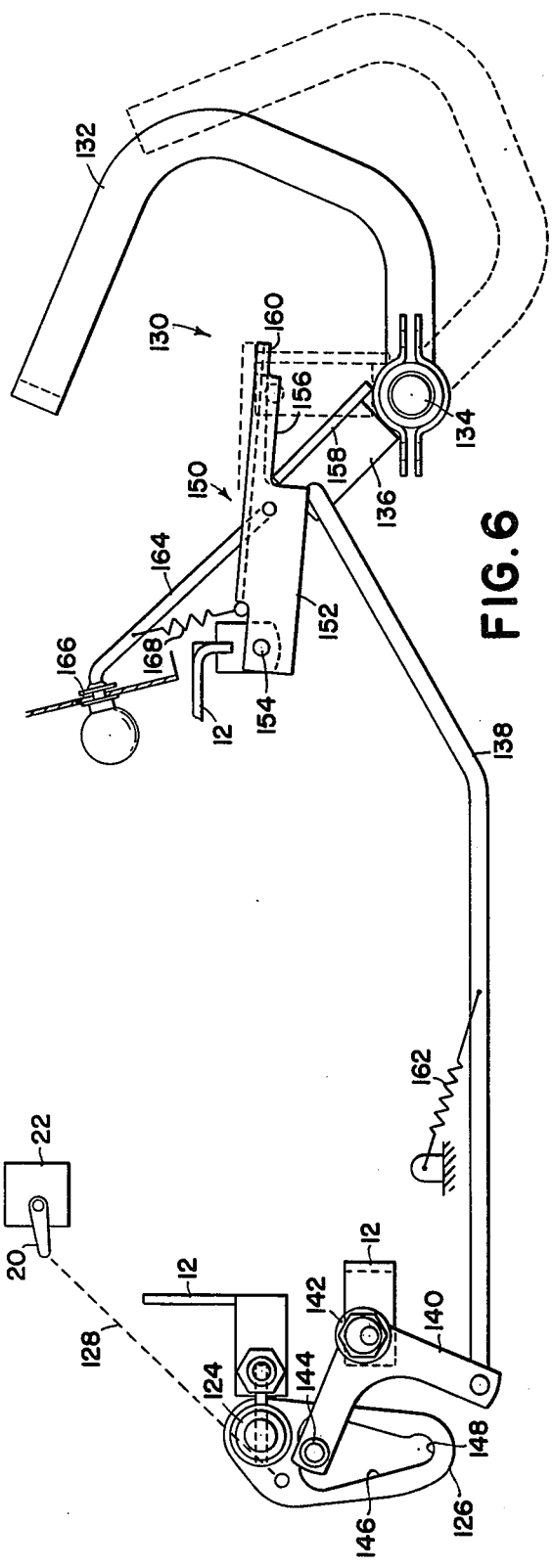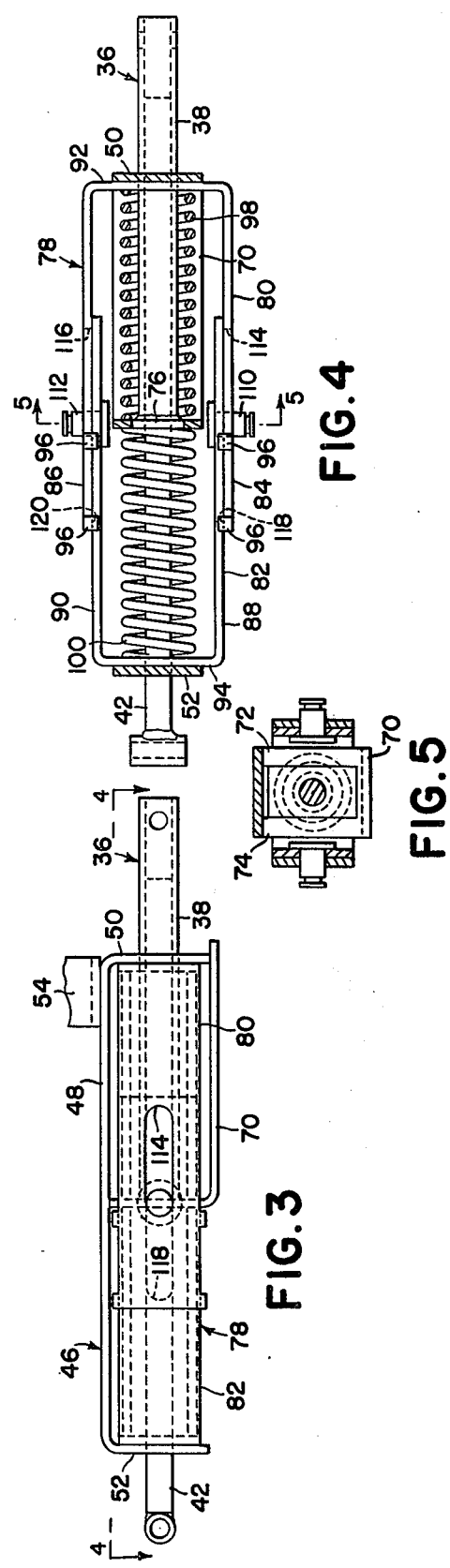

PUMP SWASH PLATE CONTROL LINKAGE

BACKGROUND OF THE INVENTION

The present invention relates to a control linkage for effecting speed and direction changes in a hydrostatic transmission by controlling the position of a swash plate of a reversible flow, variable displacement pump forming a part of the hydrostatic transmission.

It is common practice to use hydrostatic transmissions for driving the drive wheels of various vehicles including lawn and garden tractors and to employ a control linkage including a shift lever manuallly movable in opposite directions from a neutral position, wherein the swash plate is positioned so that no fluid is pumped by the pump, respectively to forward and reverse driving positions, wherein the swash plate is respectively positioned so as to cause fluid to be pumped in opposite first and second directions through the pump at rates which increase as the displacement of the lever from its neutral position increases.

These prior art control linkages are designed such that movement of each shift lever is transferred directly to the associated swash plate, so as to cause it to move in concert with the shift lever at a speed directly related to the speed of shifting of the lever. The drive speed of these transmissions, especially as normally employed in lawn and garden tractors, is quite responsive to swash plate movement. Therefore, one problem attendant with the known control linkages is that the vehicle will lurch in the event that an operator quickly moves the shift lever to effect forward and rearward drive speed increases in the transmission. This operation of the tractor is, of course, not desirable from a safety standpoint.

While "lurching" can be avoided by slowly shifting the transmission shift lever of the known control linkages, the shift levers are often operated by hand and it is undesirable, again from a safety standpoint, for an operator to have his hand preoccupied for any length of time since controlling of the steering of the tractor is more safely accomplished by using both hands.

SUMMARY OF THE INVENTION

According to the present invention, there is provided a novel control linkage for controlling the position of a pump swash plate.

A broad object of the invention is to provide a control linkage of the type described in the preceding paragraph which includes a motion-moderating section or means for regulating the maximum speed at which the swash plate may be moved while permitting a manual shift lever of the linkage to be moved at any speed willed by an operator.

More specifically, it is an object of the invention to provide a control linkage including a speed and direction selecting part comprising an input section including a manual shift lever, and an output section connected to the pump swash plate, the input and output sections being connected together by the motion-moderating section.

Yet another object of the invention is to provide a control linkage, as described herein above, wherein the motion-moderating section includes an extensible and retractable shock absorber or dash pot connected to the input section by resilient means arranged so as to become selectively loaded against the resistance of the shock absorber so as to cause extension and retraction thereof at a rate of speed governed by the shock absorber design, the shock absorber also being connected to the output section to cause the latter to be moved concurrently therewith.

Another object is to provide a control linkage having, in addition to the speed and direction selecting part, a neutral return part including a separate manually operable lever connected to the pump swash plate for moving the latter to a neutral position irrespective of the position of the manually controllable lever of the speed and direction selecting part of the control linkage.

Further objects will become apparent from a reading of the ensuing description taken with the appended drawing.

BRIEF DESCRIPTION OF THE DRAWING

FIG. 1 is a side elevational view of the speed and direction selecting part of the control linkage of the present invention as applied to a lawn and garden tractor.

FIG. 2 is a front elevational view of a part of the control linkage shown in FIG. 1.

FIG. 3 is a side elevational view of the motion-moderating mechanism, but with the shock absorber broken away.

FIG. 4 is a sectional view taken along the line 4—4 of FIG. 3.

FIG. 5 is a sectional view taken along the line 5—5 of FIG. 4.

FIG. 6 is a side elevational view of the neutral return part of the control linkage of the present invention.

DESCRIPTION OF THE PREFERRED EMBODIMENT

Referring now to FIGS. 1–5 of the drawing, therein is shown a speed and direction selecting part of the control linkage of the present invention indicated in its entirety by the reference numeral and mounted on a lawn and garden tractor of which only frame or support parts are shown, these being designated in their entirety by the reference numeral 12. The linkage part 10 comprises a motion input linkage section or means 14, a motion-moderating linkage section or means 16 and a motion output linkage section or means 18 connected together in that order and constructed in a manner to be presently described for selectively positioning a swash plate control arm 20 of a reversible flow, variable displacement pump, which is shown schematically at 22 and forms a part of a hydrostatic transmission (not shown).

The input linkage section 14 includes a manual shift lever 24 pivotally mounted on a vertical part of the frame 12 by a transverse pivot shaft 26. As is conventional, the lever 24 projects upwardly through a fore-and-aft elongated, shift quadrant guide opening 28 and is selectively swingable, about the axis of the shaft 26 to a neutral position N, to establish a neutral condition in the transmission, and to various positions forwardly and rearwardly of the neutral position to respectively establish forward and rearward driving conditions in the transmission, the speed of the transmission increasing as the distance of the lever 24 from its neutral position N increases.

Displaced forwardly of the lever 24 is a short motion transferring lever 30 pivotally mounted medially of its ends on the frame 12 through means of a second transverse pivot shaft 32 located at a level slightly below that of the shaft 26. A fore-and-aft extending link 34 has its opposite ends respectively pivotally connected to the lower end of the shift lever 24 and the upper end of the lever 30 so that clockwise swinging movement of the lever 24 about the shaft 26 will cause counterclockwise movement of the lever 30 about the shaft 32.

The motion-moderating linkage section or means 16 is connected to the lower end of the lever 30. Specifically, the linkage section 16 comprises a tubular telescopic link 36 including a front link section 38 having a forward end pivotally connected by a pin 40 to the lower end of the lever 30 and including a rear link section 42 telescopically received in the front link section and having a rear end pivotally secured to the tractor frame 12 by a pivot pin 44. A stop-forming bracket 46 includes a downwardly opening U-shaped member 48 (FIGS. 3–5) mounted on the telescopic link 36 through means of apertured front and rear legs 50 and 52, respectively. Fixed to the upper forward part of the member 48 an apertured lug 54 having the rod end of an extensible and retractable shock absorber or dash pot 56 pivotally connected thereto by a pin 58, the head end of the shock absorber 56 being pivotally connected to the frame or support 12 by means of a pin 60.

The shock absorber 56 is of a conventional type including a piston 62 fixed to an end of a rod 64, located in a fluid-filled, closed-end cylinder 66 and provided with a restricted passage 68 permitting flow of fluid between opposite sides of the piston when forces are applied to the rod 64 to cause extension or retraction of the shock absorber 56. Thus, it will be appreciated that the maximum speed at which the shock absorber 56 can be extended and retracted is dependent upon the size of the restricted passage 68.

The bracket 46 also includes an L-shaped member 70, having a bifurcated first leg comprising laterally spaced right and left furcations 72 and 74 straddling the telescopic link 36 and having top ends fixed to the U-shaped member 48 at a location midway between the front and rear legs 50 and 52. The furcations 72 and 74 are disposed in general parallelism to the legs 50 and 52 and are integral with a fore-and-aft extending second leg connected to the bottom of the front leg 50 of the member 48.

The rear end of the front link section 38 of the telescopic link 36 is formed by rectangular operating plate 76 dimensioned so as to move freely between the furcations 72 and 74 of the L-shaped member 70 and normally disposed therebetween when the control linkage is in a normal at rest condition as illustrated.

A telescopic or collapsible member 78 comprises front and rear U-shaped sections 80 and 82, respectively, arranged between the legs 50 and 52 of the U-shaped member 48 of the bracket 46 such that right and left legs 84 and 86 (FIG. 4) of the front section 80 are respectively disposed in sliding engagement with respective outer surfaces of right and left legs 88 and 90 of the rear section 80. Front and rear ends 92 and 94, respectively, of the U-shaped sections 80 and 82 connect the respective legs thereof and are respectively engaged with the legs 50 and 52 of the U-shaped member 48. The U-shaped sections 80 and 82 are maintained in longitudinal alignment with each other through means of a plurality of inwardly projecting tabs 96 formed integrally with upper and lower edges of the legs 84 and 86 of the section 80 so as to provide guides for the legs of the section 82.

For the purpose of providing a resilient connection means between the front link section 38 of the telescopic link 36 and the bracket 46, there is provided a pair of substantially identical coil compression springs 98 and 100 respectively mounted in encircling relationship to the telescopic link sections 38 and 42 and normally having respective first ends engaged with the opposite sides of the furcations 72 and 74 of the L-shaped member 70 and having respective second ends engaged with the ends 92 and 94 of the U-shaped sections 80 and 82 of the telescopic member 78. The springs 98 and 100 are normally in a compressed or preloaded state so as to maintain the telescopic member 78 in an extended condition with the ends 92 and 94 thereof in engagement with the legs 50 and 52 of the bracket 46.

It will be appreciated then that forward movement of the shift lever 24 will cause the telescopic link section 38 to be shifted forwardly an amount and at a speed directly related to the amount and speed of displacement of the lever 24 and that this movement of the link section 38 will cause the plate 76 thereof to become engaged with the rear end of the spring 98. When the speed is less than the maximum rate of extension of the shock absorber 56 permitted by the restricted passage 68, the spring 98 will act more or less as a rigid member to transfer the motion of the link section 38 directly to the bracket 46 via the front section 80 of the telescopic member 78. On the other hand, if the motion imparted to the link section 38 by the lever 24 is of a speed greater than that at which the passage 68 will permit the shock absorber 56 to extend, the movement of the link section 38 will cause further compression of the spring 98, the loaded spring then acting to shift the telescopic member 78 and bracket 46 together at the maximum rate of speed permitted by the shock absorber 56.

The output linkage section 18 of the control linkage is connected to the telescopic member 78 so as to convey the movement thereof directly to the swash plate control arm 20. Specifically, the output linkage section 18 includes a fore-and-aft extending link 102 having a forward end defined by a yoke 104 having right and left sides 106 and 108, respectively, embracing the outer surfaces of the legs 84 and 86 of the front section 80 of the telescopic member 78. The yoke sides 106 and 108 are respectively provided with transverse connecting pins 110 and 112 which are normally respectively seated in the rear ends of aligned transverse apertures 114 and 116 provided in the legs 84 and 86 of the front section of the telescopic member 78 and elongated in the direction of telescopic movement of the member 78. The pins 110 and 112 also normally extend into and are seated in the front ends of aligned transverse apertures 118 and 120 provided in the legs 88 and 90 of the rear section 82 of the telescopic member 78. Thus, the forward end of the link 102 is connected to both sections 80 and 82 of the telescopic member 78, the elongated apertures in the sections 80 and 82 affording lost motion for a purpose to be presently described. The rear end of the link 102 is pivotally connected, as at pin 121, to a crank arm 122 fixed to a rock shaft 124 having a swash plate control cam 126 pinned thereto for rotation therewith. A link denoted by the dashed line 128 connects the cam 126 to the swash plate control arm 20.

Referring now to FIG. 6 of the drawing, therein is shown a neutral return part of the control linkage designated in its entirety by the reference numeral 130. The linkage part 130 would normally be mounted on the frame 12 at the opposite side of the tractor from the speed and direction selecting part 10 of the control linkage. The linkage 130 includes a foot pedal 132 pivotally mounted on the frame 12 through means of a transverse pivot shaft 134, the shaft 134 being located on FIG. 1 as a point of reference. The pedal 132, as illustrated in solid lines in FIG. 6, includes a rearwardly projecting end portion 136 and the forward end of a fore-and-aft extending motion transfer link 138 is pivotally mounted in the end portion 136. The rear end of the link 138 is pivotally connected to one arm of a bell crank 140, which is pivotally mounted on the frame 12 as at a connection 142 and includes a second arm provided with a roller 144 disposed within a generally triangular aperture 146 defining an internal cam surface of the cam 126. The aperture 146 is shaped such that when the pedal 132 is in a released position, as shown in solid lines, the roller 144 will remain out of operating contact with the cam 126 when the latter is moved by operation of the speed and direction selecting part 10 of the control linkage. On the other hand, initial movement of the foot pedal 132 towards an actuated position illustrated in dashed lines in FIG. 6 effects movement of the roller 144 to a lower end 148 of the aperture 146, further movement then effecting rocking of the cam 126 to establish a neutral condition in the pump 22 and hence the transmission. It is here noted that this movement of the cam 126 will effect corresponding rotation of the rock shaft 124 and crank arm 122. If the crank arm 122 is swung clockwise as viewed in FIG. 1, the link 102 will be shifted rearwardly and the pins 110 and 112 will transfer this movement to the forward section 80 of the telescopic member 78 and will cause the section 80 to be moved against the action of the spring 98, which in turn acts against the furcations 72 and 74 of the L-shaped member 70 of the bracket 46. The bracket 46 will then begin to shift along the telescopic link 26 against the resistance of the shock absorber 56, but will only shift a distance sufficient to bring the spring 98 into contact with the operating plate 76 of the front section 38 of the telescopic link 36. Since the link section 38 is held in place by the lever 24, the spring 98 will remain loaded until the operator places the lever 24 in its neutral position.

A latch mechanism 150 is provided for locking the foot pedal 132 in its actuated position. The mechanism 150 includes a forwardly projecting latch arm or member 152 pivotally connected at its rear end to the frame 12 by a pin 154. The latch arm 152 has a stepped bottom side defining a first surface means 156 which rests or bears on the forward edge of a transverse plate 158 forming part of the pedal end portion 136 when the pedal 132 is in its released position. As the pedal 132 is depressed, the latch arm 152 will be slightly lifted by the pedal portion 136 until the plate 158 moves into a second surface means 160 forming a notch at the forward end of the underside of the latch arm 152. A tension spring 162 is connected between the frame 12 and the link 138 and acts to seat the plate 158 of the pedal end portion 136 in the second surface means 160 with sufficient force to maintain the pedal 132 in its actuated position.

A latch release rod 164 is provided for moving the latch arm 152 so as to permit the disengagement thereof from the pedal 132 so that the latter will be moved to its released position by the spring 162. The latch release rod 164 has a lower end pivotally connected to the latch arm 152 at a location approximately midway between opposite ends of the arm 152 and has an upper end located in a vertically elongated aperture 166 provided in the frame 12 of the tractor. A tension spring 168 is connected between the latch arm 152 and the release rod 164 so as to normally maintain the upper end of the latter located in the lower end of the aperture 166. It will thus be appreciated that the latch arm 152 may be released from engagement with the foot pedal end portion 136 by merely depressing the pedal 132 and lifting the rear end of the release rod 164 in the aperture 166 so as to cause counterclockwise movement of the latch arm 152 about the pivot pin 154.

The operation of the control linkage is as follows. Assuming the tractor is in operation with the shift lever 24 in the operative position shown in FIG. 1 and with the foot pedal 132 in the released or inoperative position shown in solid lines in FIG. 6, the tractor will be traveling forwardly at a slow rate of speed since the lever 24 is just slightly ahead of its neutral position.

If the operator then desires to increase the speed of the tractor to its ultimate (for any particular engine speed setting) he need only to move the lever 24 to the forward end of the guide opening 28. Forward movement of the lever 24 will act through the link 34 and lever 30 to effect corresponding movement of the front section 38 of the telescopic link 36 and cause the operating plate 76 to move against the rear end of the coil compression spring 98. If the movement of the plate 76 is at a speed less than the maximum speed of extension or retraction of the shock absorber 56, the movement of the plate 76 will cause little, if any, further compression of the spring 98 and will be transferred thereby to the telescopic member 78 which in turn transfers the movement directly to the bracket 46 and the shock absorber 56. As the telescopic member 78 moves, the motion thereof will also be transferred, via the pins 110 and 112, to the link 102, which in turn acts to operate the rock shaft 124 resulting in counterclockwise rotation of the cam 126, which acts through the link 128 to adjust the swash plate control arm 20 in a direction for effecting an increase in the forward driving speed of the tractor.

On the other hand, if the shift lever 24 is moved so as to cause the operating plate 76 of the telescopic link 36 to be moved at a speed faster than the maximum speed of extension or retraction of the shock absorber 56, the plate 76 will compress the spring 98 beyond its preload. The spring 98 then loads the telescopic member 78 and the bracket 46 against the resistance to quick movement afforded by the shock absorber 56. The loaded spring 98 will then unload causing the telescopic member 78 to be shifted together with the bracket 46 at the maximum rate permitted by the shock absorber 56. This movement of the telescopic member 78 will, of course, be transferred directly to the cam 126, as described above, to effect movement of the swash plate control arm 20.

It is here noted that movement of the cam 126 through means of the speed and direction selecting part 10 of the control linkage will not have any effect on the neutral return part 130 of the control linkage since the roller 144 of the linkage part 130 will remain in the upper portion of and will not be operatively contacted by the sides of the aperture 146.

If some emergency arises where it is necessary to quickly neutralize the transmission when the latter is in a forward driving condition as illustrated, the operator need only to depress the foot pedal 132. This will cause the rearwardly projecting end portion 136 of the pedal to be swung upwardly about the pivot shaft 134 resulting in forward movement of the link 138 and consequent counterclockwise movement of the bell crank 140. As the bell crank 140 moves counterclockwise, the roller 144 will be moved into contact with the lower end 148 of the operating surface defined by the aperture 146 in the cam 126. The cam 126 will swing clockwise so as to return the pump swash plate control arm 20 to a position for effecting a neutral condition in the transmission. This movement of the cam 126 will result in corresponding movement of the rock shaft 124 and crank arm 122 so as to effect rearward movement of the link 102 of the speed and direction selecting part 10 of the control linkage. As the link 102 moves rearwardly, the pins 110 and 112 connecting it to the telescopic member 78 will operate against the rearward ends of the apertures 114 and 116 in the front section 80 of the telescopic member 78 to cause the front section to be telescoped rearwardly relative to the rear section 82 as permitted by the apertures 118 and 120 of the rear section 82. This movement of the front section 80 will be transferred to the front compression spring 98 and will compress the latter beyond its preload, such further compressed state of the spring remaining until the shift lever 24 is positioned in its neutral position.

It is to be noted that due to the fact that the compression springs 98 and 100 are contained between equal-length parts of bracket 46, the springs 98 and 100 need not be of equal stiffness (although they preferably are) to properly position the bracket once an input is received from the motion input linkage section 14 by the motion moderating linkage section 16. Thus, production variations in the stiffness of the springs 98 and 100 can be tolerated.

I claim:

1. For use in controlling an adjustable swash plate of a variable displacement hydraulic drive pump of a hydrostatic transmission, a manual control linkage comprising: a manually shiftable input linkage means; an output linkage means adapted for connection to said adjustable swash plate; a motion-moderating means connecting said input linkage means to said output linkage means for transferring the motion of said input linkage means to said output linkage means at a preselected maximum rate of speed regardless of the rate of speed that motion is manually imparted to said input linkage means; and said motion-moderating means including a motion-transferring member mounted for movement in opposite first and second directions; dash pot means connected to said motion-transferring member for regulating the rate of speed of the movement of the member such that said preselected maximum rate of speed is not exceeded; first connecting means connecting said input linkage means to said motion-transferring member and including resilient means normally in a self-restored state wherein it exerts no force tending to move said motion-transferring member, but being selectively deflectable in opposite directions by said input linkage means when the latter is operated to move at a rate of speed greater than said preselected maximum rate to establish first and second loaded conditions tending to move said motion-transferring member in its said opposite first and second directions; and second connecting means connecting said output linkage means to said motion-transferring member for movement with the latter.

2. The control linkage defined in claim 1 wherein said first connecting means further includes a telescopic link having a first section pivotally connected to a support frame and having a second section slidably mounted on said first section and pivotally connected to said input linkage means; said second section having a flanged end remote from said input linkage means; said motion-transferring member including first and second spaced abutment surfaces facing each other and disposed adjacent said telescopic link; and said resilient means including first and second coil compression springs encircling said telescopic link and respectively disposed such that the first spring is compressively loaded between said flanged end and said first abutment surface when the telescopic link is extended by the input linkage means and the second spring is compressively loaded between said flanged end and said second abutment surface when the telescopic link is retracted by said input linkage means.

3. The control linkage defined in claim 2 wherein said second connecting means includes a collapsible member having first and second sections including respective side portions located beside each other and including respective first ends located so as to be respectively sandwiched between said first and second compression springs and said first and second abutment surfaces of said motion-transferring member when said collapsible member is in a normal extended condition; said respective side portions each containing an aperture elongated so as to be generally parallel to the movement of said side portions; connection pin means slidably received in the apertures of the collapsible member and connected to said output linkage means; and the respective apertures of the respective side portion of said first and second sections of the collapsible member being so located relative to each other that only respective end portions thereof overlap when the collapsible member is in said normal extended condition; said pin means being located so as to be received in said respective end portions when they are overlapped; and said control linkage further including a manually operable override linkage means being connected to said swash plate independently of said manually shiftable input linkage means for moving the swash plate so as to neutralize the transmission regardless of the position of the manually operable input linkage means, whereby movement of the swash plate caused by said override linkage means is fed back through said output linkage means to said collapsible member to cause the latter to momentarily collapse.

4. The control linkage defined in claim 1 wherein said dash pot means comprises an extensible and retractable shock absorber.

5. A control linkage for controlling the position of swash plate control arm of a variable displacement, reversible flow pump, comprising: a manually operable lever pivotally mounted on a frame for swinging movement in opposite directions from a neutral position; a telescopic link having one end pivotally connected to the frame and having a second end connected to the lever by a linkage means for transferring swinging movement of the lever to the telescopic link to cause extension and retraction of the latter; a bracket slidably mounted on the telescopic link for movement therealong; an extensible and retractable shock absorber disposed adjacent to and in general parallel relationship to said telescopic link and having opposite ends respectively pivotally connected to said frame and said bracket; said shock absorber including means for limiting the retraction and extension thereof to a preselected maximum speed; said bracket having first, second and third abutment means spaced from each other along the length of and being disposed adjacent said telescopic member with said third abutment means being located between and equidistant from said first and second abutment means; first and second coil compression springs received on said telescopic link and respectively having first ends normally engaged with opposite sides of said third abutment means; first and second members slidably mounted on said telescopic link and respectively located between respective second ends of said first and second coil compression springs and said first and second abutment means; a second linkage means connecting said first and second members to said swash plate control arm, and said telescopic link including an operating plate arranged for engaging said first end of the first spring when the lever is pivoted in a first direction and for engaging said first end of the second spring whereby movement of said plate at a rate faster than said preselected maximum rate of movement of the shock absorber will result in compression of one or the other of the first and second springs which then unload to respectively drive said first and second members at said predetermined maximum speed.

* * * * *